US011589525B2

(12) United States Patent
Schmutzer

(10) Patent No.: US 11,589,525 B2
(45) Date of Patent: Feb. 28, 2023

(54) PLANT CULTIVATION DEVICE

(71) Applicant: Lucas Schmutzer, Brunn am Gebirge (AT)

(72) Inventor: Lucas Schmutzer, Brunn am Gebirge (AT)

( * ) Notice: Subject to any disclaimer, the term of this patent is extended or adjusted under 35 U.S.C. 154(b) by 5 days.

(21) Appl. No.: 17/050,104

(22) PCT Filed: Apr. 26, 2019

(86) PCT No.: PCT/EP2019/060702
§ 371 (c)(1),
(2) Date: Oct. 23, 2020

(87) PCT Pub. No.: WO2019/207088
PCT Pub. Date: Oct. 31, 2019

(65) Prior Publication Data
US 2021/0100178 A1 Apr. 8, 2021

(30) Foreign Application Priority Data
Apr. 26, 2018 (EP) .................................. 18169435

(51) Int. Cl.
*A01G 31/04* (2006.01)
(52) U.S. Cl.
CPC .................. *A01G 31/047* (2013.01)
(58) Field of Classification Search
CPC ...... A01G 31/047; A01G 31/06; A01G 31/04; A01G 31/02; A01G 9/26; B25F 1/02
USPC ........................ 901/16; 47/58.1 SE
See application file for complete search history.

(56) References Cited

U.S. PATENT DOCUMENTS

| 5,617,673 A * | 4/1997 | Takashima ........... A01G 31/047 47/60 |
| 5,862,628 A | 1/1999 | Takashima |
| 6,298,575 B1 * | 10/2001 | Aikins .................. F26B 11/026 34/313 |
| 10,477,786 B1 * | 11/2019 | Wilson .................... A01G 9/042 |
| 2002/0088173 A1 | 7/2002 | Hessel et al. |
| 2014/0165468 A1 * | 6/2014 | Roeser ................. A01G 31/047 47/32.7 |

(Continued)

FOREIGN PATENT DOCUMENTS

WO 2016058084 A1 4/2016

OTHER PUBLICATIONS

Extended European Search Report, EP 18169435.7 dated Oct. 24, 2018.

*Primary Examiner* — Joshua D Huson
*Assistant Examiner* — Megan J Moroney
(74) *Attorney, Agent, or Firm* — Daniel J. Chalker; Edwin S. Flores; Chalker Flores, LLP

(57) ABSTRACT

The invention relates to a plant cultivation device (1) having: a housing (2), a receiving drum (3) which is rotatably mounted on the housing (2) and comprises multiple plant receiving containers (5) for plants (6), a drive (8) for rotating the receiving drum (3) within the housing (2), and a robot device (10) with a mounting (11) for a first working head (12) for supplying the plants (6) into the plant receiving containers (5), comprising a first linear guide (13) for moving the mounting (11) for the first working head (12) along a first axis and comprising a second linear guide (14) for moving the first linear guide (13) together with the mounting (11) for the first working head (12) along a second axis.

14 Claims, 7 Drawing Sheets

(56) References Cited

U.S. PATENT DOCUMENTS

| | | | |
|---|---|---|---|
| 2016/0089792 A1* | 3/2016 | Ojalehto | B25J 15/0441 |
| | | | 901/50 |
| 2016/0360711 A1* | 12/2016 | Vesty | A01G 31/047 |
| 2017/0055472 A1* | 3/2017 | Gunther | A01G 31/047 |
| 2017/0099792 A1* | 4/2017 | Gallant | A01G 31/047 |
| 2017/0105371 A1* | 4/2017 | Cleveland | A01K 63/04 |
| 2018/0295800 A1* | 10/2018 | Kiernan | A01D 45/00 |

* cited by examiner

PLANT CULTIVATION DEVICE

CROSS-REFERENCE TO RELATED APPLICATIONS

This application claims priority to and is a National Stage Patent Application of International Application No. PCT/EP2019/060702, filed on Apr. 26, 2019, which claims priority to EP 18169435.7, filed on Apr. 26, 2018, the contents of each of which is incorporated by reference herein.

TECHNICAL FIELD OF THE INVENTION

The invention relates to a plant cultivation device having:
a housing,
a receiving drum which is rotatably mounted on the housing and comprises multiple plant receiving containers for plants,
a drive for rotating the receiving drum within the housing.

SUMMARY OF THE INVENTION

Because of the rotating plant receiving containers, in prior art such plant cultivation devices are often referred to as a "hydroponic Ferris wheel".

In U.S. Pat. No. 6,840,007 B2, for instance, there is described a rotary apparatus for growing plants. The apparatus comprises a frame with elongated receiving baskets mounted thereon for the plants. The frame together with the receiving baskets is held over a watering station by means of a support stand. The watering station comprises a water tank which feeds a concave receiving tray. When the apparatus is rotated, the receiving baskets for the plants are passed through the feeding tray. Said design is, however, detrimental in that the water supply of the plants, when they pass through the receiving tray, is hardly target-oriented. With regard to said problem, in prior art it is only proposed to control the filling level of the feeding tray or to lift the frame in order to interrupt the water supply temporarily. Furthermore, standing water in connection with organic matter will lead to bacteria build-up and silting.

WO 2016/058084 A1 discloses an apparatus for optimizing the growth of a plant in a horticultural device, wherein at least one property of the plant is measured, the optimal nutritional requirement of the plant is calculated based on the measurement, and then an optimal amount of water and/or fertilizer is fed to the plant.

U.S. Pat. No. 5,862,628 A shows a growing system which comprises a stationary core assembly, a rotating drum assembly which is rotated by a motive assembly, an enclosing assembly, a growth requirements assembly, and a control assembly.

In US 2002/088173 A1 there is disclosed a system for providing a continuous yield of fresh agricultural produce, in which seeds are taken out of a seed reservoir by means of a robotic device for seeding, planting and harvesting which includes a robotic arm which is used for seeding the seeds.

The object of the present invention is to mitigate or to remove at least one disadvantage of prior art. The aim of the invention is in particular the automation of the supplying of the plants, in particular already the planting and possibly also the harvesting, by means of technically simple means.

The invention is characterized by a robot device with a mounting for a first working head for supplying the plants in the plant receiving containers, comprising a first linear guide for moving the mounting for the first working head along a first axis and comprising a second linear guide for moving the first linear guide together with the mounting for the first working head along a second axis.

Accordingly, the supplying of the plants, in particular also already the seeding, is carried out by means of the robot device. To this end, the first working head will be attached, preferably in a releasable manner, at the mounting of the robot device. The releasable reception of the first working head is preferably controlled by a control unit. In order to be able to move the first working head within the receiving drum to the desired location, for instance one of the plants in the plant receiving containers, an (at least) biaxial guide unit or drive unit is provided with the first linear guide and the second linear guide. The guide unit is preferably connected to a drive device, for instance an electric motor, which effects the movement along the first or second axis. The drive device is preferably controlled by an electronic control unit. In order to be able to reach any location within the plant receiving containers, the electronic control unit coordinates the movement of the first working head of the robot device with the rotation of the receiving drum. For a targeted management of the plant receiving containers, the electronic control unit can include a control program which will be operative during the operation of the plant cultivation device.

The working head, the pertaining mounting and the linear guides are known in prior art from other plant cultivation systems for the management of beds or patches in open air having a rectangular form when seen from above, for instance from the open source project "FarmBot" (https://en.wikipedia.org/wiki/FarmBot). With the present plant cultivation device there is, however, obtained the particular advantage that, in contrast to the known design, the robot device can be substantially simplified, as the rotatable receiving drum already provides a degree of freedom of the movement, namely a rotational degree of freedom. Furthermore, a space-saving design is obtained which, moreover, is also independent of weather conditions.

For the purposes of the present disclosure, the statements of location and direction like "above", "below", "front", "rear" refer to a condition of use of the plant cultivation device with a substantially horizontal orientation of the rotational axis of the receiving drum. In case of a divergent arrangement of the plant cultivation device, for instance with a vertical orientation of the rotational axis of the receiving drum, the statements of location and direction have to be transferred correspondingly.

In accordance with a preferred embodiment, the first axis of the robot device extends substantially in the vertical direction, and the second axis of the robot device extends substantially in the direction of the rotational axis of the receiving drum. By means of the first linear guide, the first working head at the mounting can be moved from a lifted waiting position, in which a collision with the plants can be avoided when the receiving drum is rotated, and a lowered working position, in which individual plants in the plant receiving containers are supplied, for instance watered. Furthermore, the second linear guide enables that each plant in the plant receiving containers, which preferably extend in the axial direction, can be reached.

In said embodiment it is in particular provided that the second axis of the robot device coincides substantially with the rotational axis of the receiving drum. Therefore, advantageously, the second linear guide will be arranged centrally within the receiving drum.

In accordance with a particularly preferred embodiment, the working head has exactly two translational degrees of freedom, namely along the first axis and the second axis.

Therefore, in this embodiment it is done without a linear guide in the horizontal direction perpendicular to the rotational axis of the receiving drum. Said implementation is of a particularly simple construction. But in connection with the rotating receiving drum it is sufficient for reaching the individual plants in the plant receiving containers with the working head. To this end, it is only required that the receiving drum is brought into the suitable rotational position and that then the working head is moved correspondingly via the first and second linear guide. Therefore, by the combination of the rotating receiving drum with the biaxial robot device, the supplying of the plants can be guaranteed in a simple and effective manner.

In order to automate different tasks of the plant cultivation, it is favourable if a holder for exchangeable attachments for the exchange of the first working head for a second working head, preferably also for the exchange of the first working head for a third working head, in particular furthermore for the exchange of the first working head for a fourth working head is provided. Accordingly, the mounting of the robot device is equipped with the first working head in a first functional position, with the second working head in a second functional position, possibly with the third working head in a third functional position, and with the fourth working head in a fourth functional position. Each working head can fulfil at least one function in the planting and supplying or feeding of the plants.

In order to simplify the exchange between the first and second, preferably furthermore the third and fourth working head, it is advantageous if the holder for exchangeable attachments is mounted on the housing in particular pivotally, preferably rotatably about a substantially vertical axis. Hence, in operation the holder for exchangeable attachments can be pivoted or rotated such that the respective delivery or reception point for the first or second (and possibly also the third or fourth) working head can be reached by moving the mounting at the robot device along the first and second linear guide. Therefore, advantageously, the exchange between the first and second working head (or the third and fourth working head) can be carried out in a simple manner without the robot device requiring a translational degree of freedom in the direction transverse to the rotational axis.

It is particularly preferred that the vertical pivot axis or rotational axis of the holder for exchangeable attachments extends substantially in a vertical centre plane or symmetry plane of the receiving drum in which also the horizontal rotational axis of the receiving drum extends.

In accordance with a preferred embodiment there is provided a drive unit, in particular an electric motor, for pivoting, in particular rotating, the holder for exchangeable attachments. In case of a switching between the different functional positions of the robot device, the holder for exchangeable attachments can be moved by means of the drive unit on the one hand into the first, second, third of fourth delivery position for delivering the first, second, third or fourth working head from the mounting at the robot device to the holder for exchangeable attachments, and on the other hand into the first, second, third or fourth receiving position for receiving the first, second, third or fourth working head from the holder for exchangeable attachments into the mounting at the robot device. Preferably, the first, second, third and fourth delivery position coincides with the first, second, third and fourth receiving position of the holder for exchangeable attachments.

In accordance with a preferred embodiment, the holder for exchangeable attachments comprises at least one first receptacle for the first working head and a second receptacle for the second working head, wherein preferably a third receptacle for the third working head and/or a fourth receptacle for the fourth working head is provided. The first and second and possibly also the third and fourth receptacles are preferably each formed as upwardly open recesses of the holder for exchangeable attachments, in which the first, second, third or fourth working head can be arranged preferably in a substantially exactly fitting manner.

Depending on the design, the first working head can be formed as a suction attachment for sucking in seeds, or as a watering attachment for watering the plants, or as a sensor attachment for measuring in particular a pH value, or as a weed suppression attachment for suppressing weed.

In accordance with a preferred embodiment, the first working head is formed as a suction attachment for sucking in seeds, and/or the second working head is formed as a watering attachment for watering the plants, and/or the third working head is formed as a sensor attachment for measuring in particular a pH value, and/or the fourth working head is formed as a weed suppression attachment for suppressing weed.

In order to enable an automatic planting of the plants in the plant receiving containers, the holder for exchangeable attachments comprises at least one seed storage compartment. In the seed storage compartment there can be stored seeds which can be sucked in particularly by means of the suction attachment of the robot device and can be delivered at the plant receiving containers.

In order to simplify the exchange of the working heads, it is favourable if substantially one half of the holder for exchangeable attachments preferably protrudes forwards from the housing. The other half of the holder for exchangeable attachments can (temporarily) be hidden in the housing. Thus, at least one of the receptacles of the holder for exchangeable attachments can be arranged externally of the housing such that said receptacle is accessible for the insertion of the working head (or for the delivery of the working head). For the reception or delivery of the working head there is provided—as known per se in prior art from "FarmBot"—a releasable connection, in particular a plug connection or magnetic connection.

In accordance with a further embodiment, the holder for exchangeable attachments is located underneath the receiving drum.

In accordance with a further embodiment, the holder for exchangeable attachments is circular in cross-section (perpendicular to the pivot axis or rotational axis of the holder for exchangeable attachments).

In order to enable the supplying of the plants with a compact structure, a further embodiment provides that the second linear guide of the robot device protrudes forwards in a freely projecting manner from a rear wall in the direction of the rotational axis of the receiving drum. In this embodiment, the free end of the second linear guide is not supported from below.

In accordance with another embodiment, at its front side the housing comprises a door for closing the receiving drum. Accordingly, in this implementation variant the receiving drum has an access opening at the front side thereof which can be opened or closed by means of the door.

In accordance with a further embodiment, a fresh water tank is provided which is connected to the robot device via a fresh water line. Said embodiment is in particular useful when no tap or water connection for running water is available.

In order to be able to stack multiple corresponding plant cultivation devices on top of each other, it is favourable if the housing is substantially cuboidal.

In accordance with another embodiment, at least one luminary is provided, preferably at a rear wall of the housing facing towards the receiving drum and/or at the second linear guide of the robot device.

As plant receiving containers, preferably tube elements elongated in the direction of the rotational axis of the receiving drum and preferably made of synthetic material, with openings at the upper side thereof for the plants, are provided.

In order to be able to move the working head of the robot device precisely to the desired location within the receiving drum, in a further embodiment there is provided a sensor for sensing the rotational position of the receiving drum. For the formation of the sensor, in a simple embodiment the receiving drum can comprise at least one, preferably a multiplicity of, in particular a plurality of pressure sensors which are spaced from each other in the circumferential direction of the receiving drum. The at least one pressure sensor can for instance be actuated by means of a fixed actuation element, such as a protrusion, at the housing. Upon activation of one of the pressure sensors by the actuation element, the current rotational position between the receiving drum and the housing will be detected. The more pressure sensors there are provided at the receiving drum, the higher is the resolution with which the rotational position of the receiving drum to the housing is known. The relative rotational position can then be transmitted to the control unit. Hence, the rotational position of the receiving drum is known at any time. The rotational position will be transmitted to the robot device as an input signal so that the approaching to the desired position, for instance one of the openings of the plant receiving containers, can be carried out precisely.

In accordance with a further embodiment, a first blocking device is provided between the receiving drum and the housing in order to release the rotation of the receiving drum in a first direction of rotation and to block said rotation in a second direction of rotation. Thereby it can be prevented that heavier plants will turn the receiving drum when the drive is not active.

In accordance with another embodiment, a second blocking device is provided between the receiving drum and the housing thereof in order to release the rotation of the receiving drum in the first direction of rotation in a release position and to block said rotation in a blocking position. Accordingly, the second blocking device can be moved between the release position and the blocking position in order to optionally release or block the rotation of the receiving drum in the first direction of rotation.

BRIEF DESCRIPTION OF THE DRAWINGS

The invention will be explained further by means of a preferred embodiment as represented in the drawings.

DETAILED DESCRIPTION OF THE INVENTION

Figure 1:
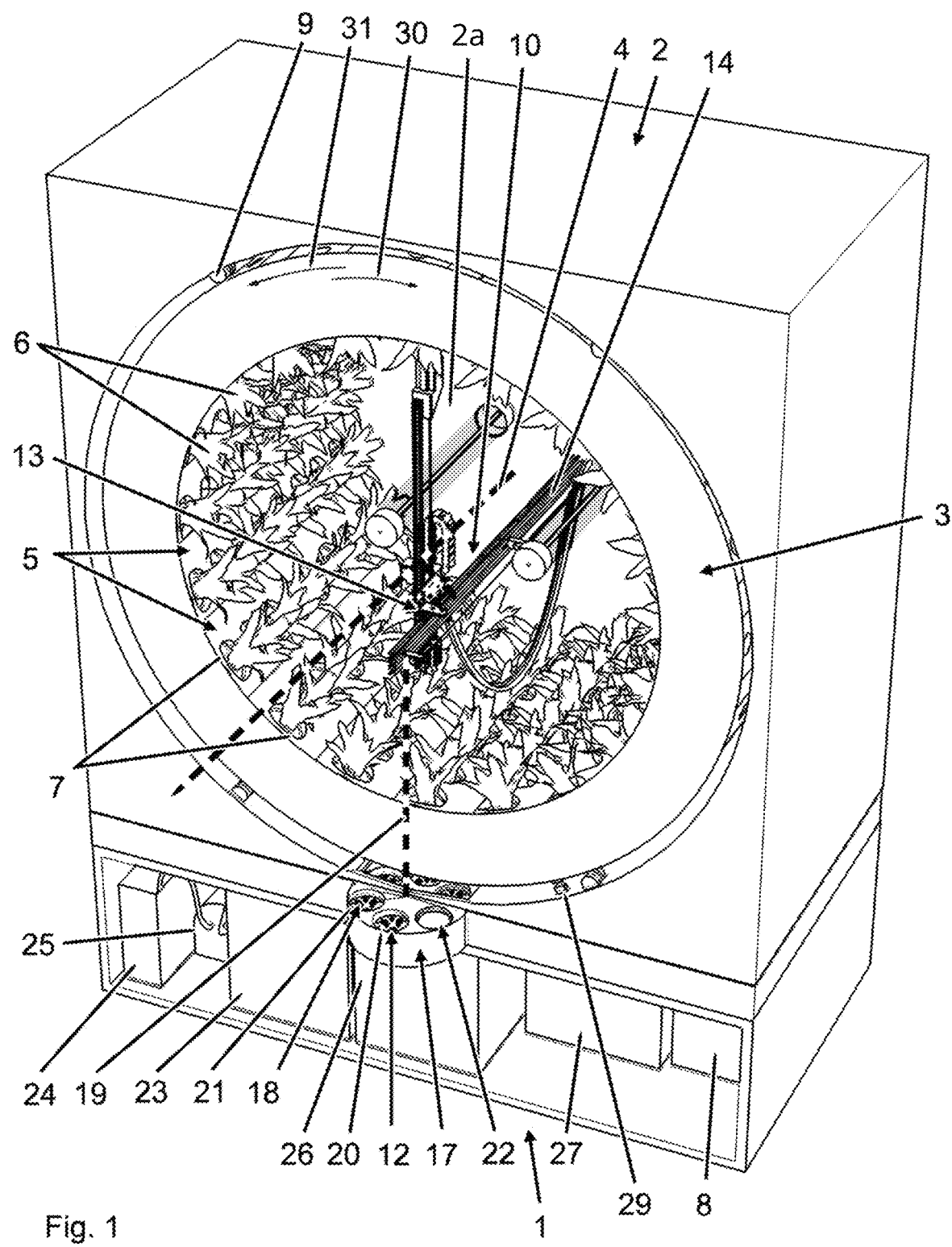
FIG. 1 schematically shows a plant cultivation device having a housing and a receiving drum which is rotatable therein, in which multiple plant receiving containers are supplied via an exchangeable working head of a biaxial robot device.
Figure 2:
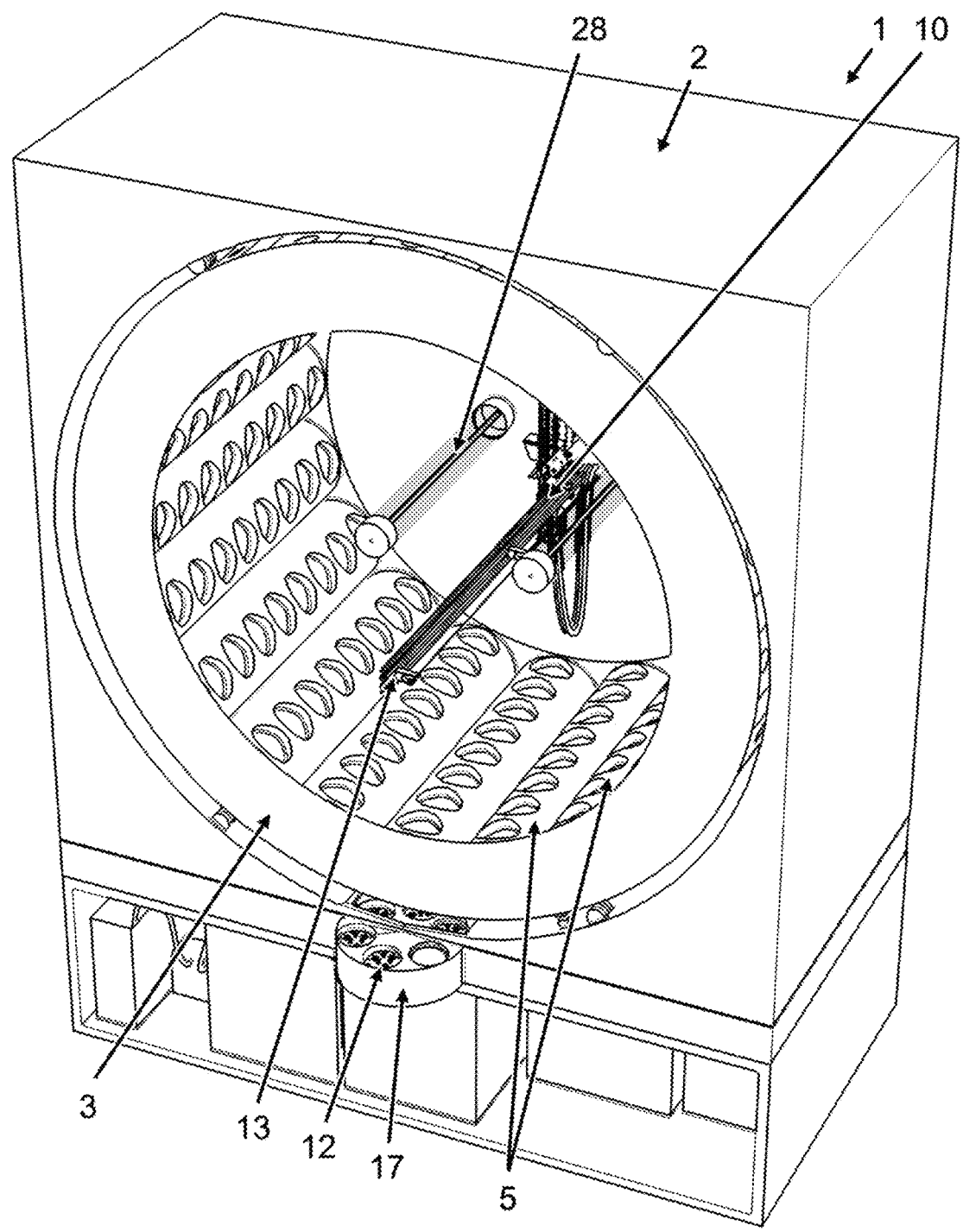
FIG. 2 shows the plant cultivation device according to FIG. 1 in a waiting position of the robot device, in which a mounting for the working head is moved rearwards and upwards.
Figure 3:
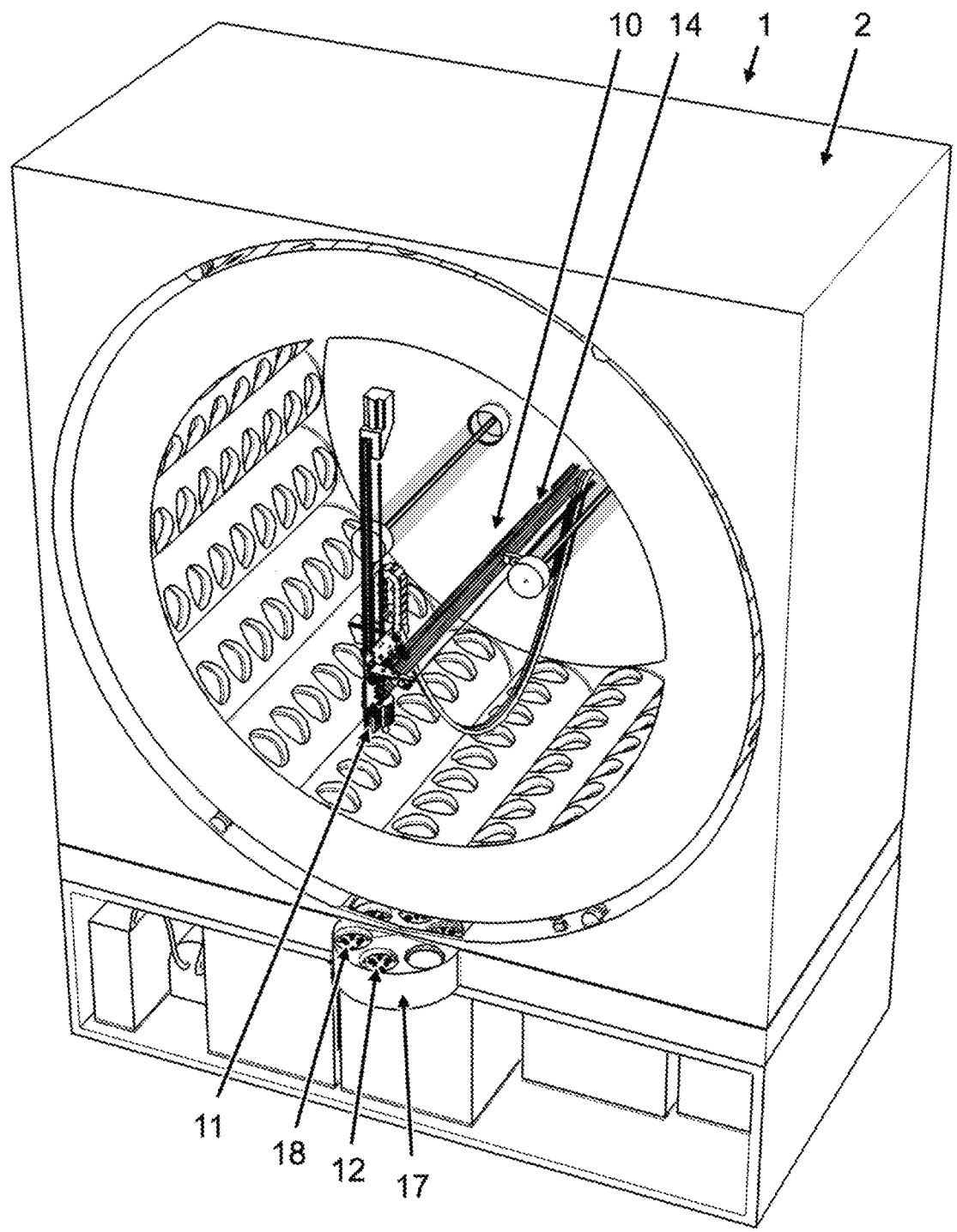
FIG. 3 shows the plant cultivation device according to FIGS. 1, 2, in which the mounting of the robot device is moved forwards in order to prepare the receptacle of a working head at the mounting of the robot device.
Figure 4:
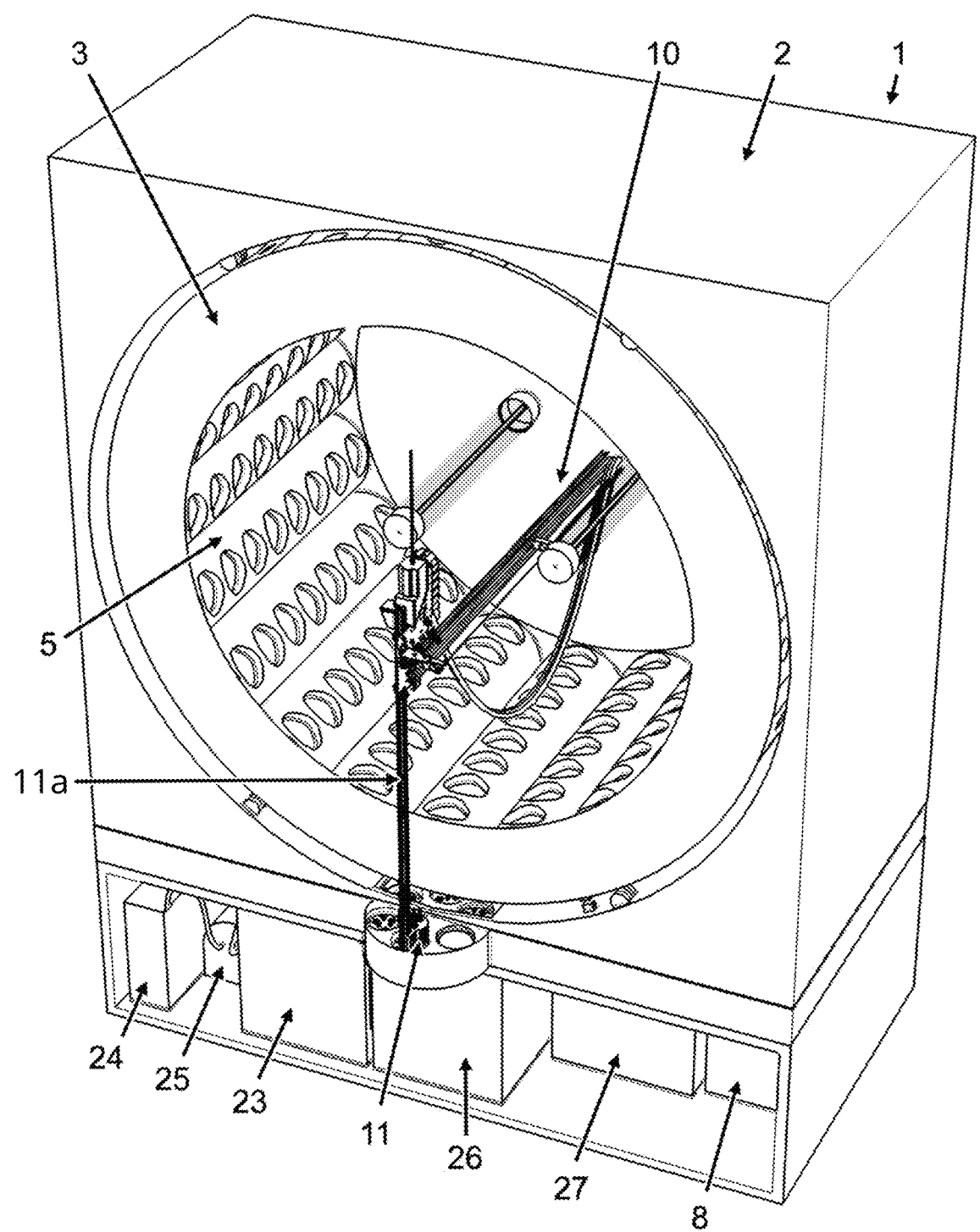
FIG. 4 shows the plant cultivation device according to FIGS. 1 to 3, in which the mounting of the robot device is moved downwards in order to connect the working head at the mounting.
Figure 5:
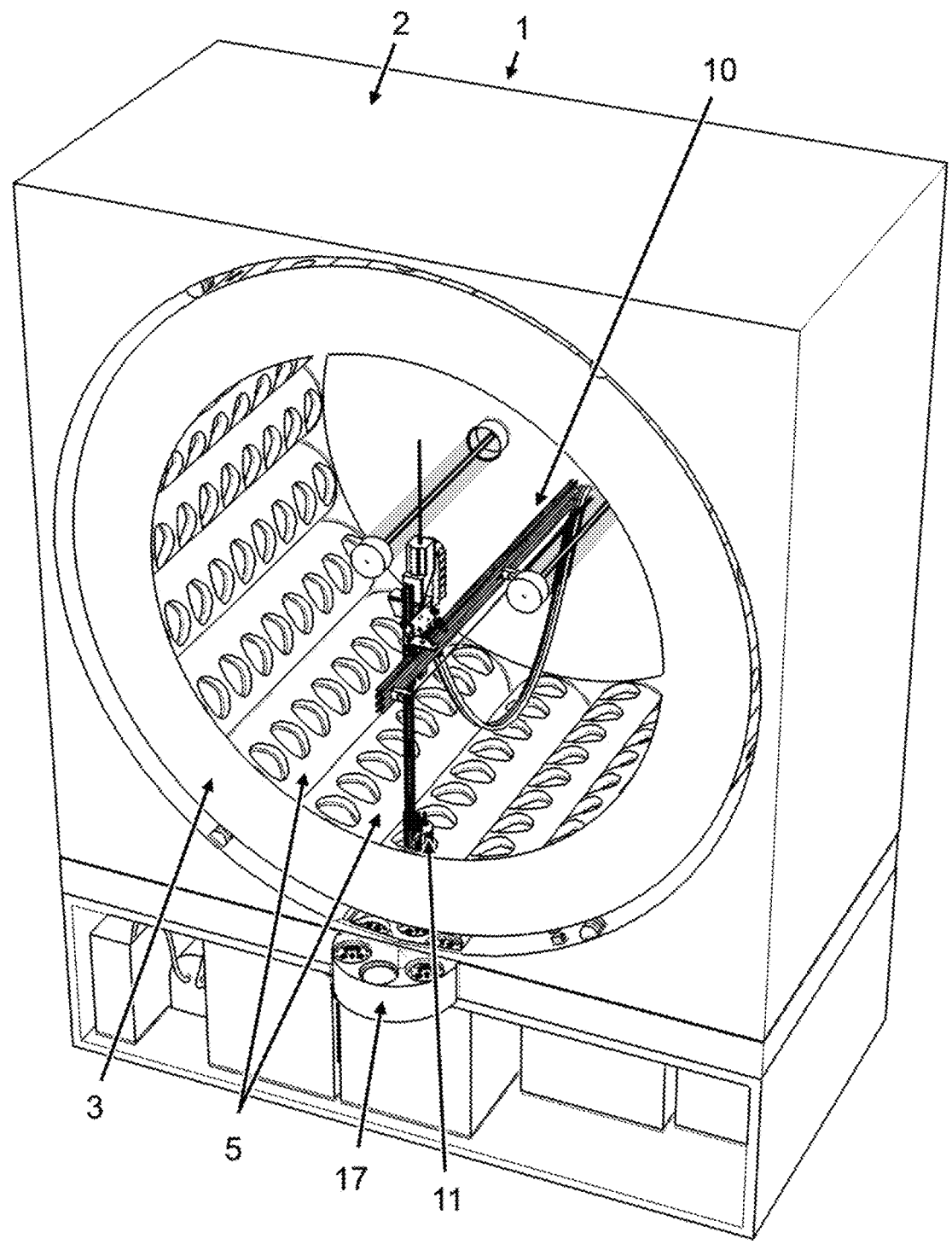
FIG. 5 shows the plant cultivation device according to FIGS. 1 to 4, in which the working head at the mounting of the robot device was approached to one of the plants.

The figures show a plant cultivation device 1 with a housing 2 in which a receiving drum 3 is mounted rotatably about a rotational axis 4. The housing 2 is cuboidal so that multiple plant cultivation devices 1 (as represented) can be stacked one upon the other. At the inside of the receiving drum there are arranged some plant receiving containers 5 for the cultivation of plants 6, as for instance vegetables. Elongated tube elements, in particular made of synthetic material, are provided as plant receiving containers 5 in the direction of the rotational axis 4 of the receiving drum 3. As plant receiving containers 5 there are preferably provided hydroponic containers. At the upper sides of the tube elements there are formed openings 7 for the plants. For the rotation of the receiving drum 3 within the housing 2 there is provided a drive 8, preferably an electric motor, which is connected with bearings 9 (see also FIG. 7) between the receiving drum 3 and the housing 2.

Figure 6:
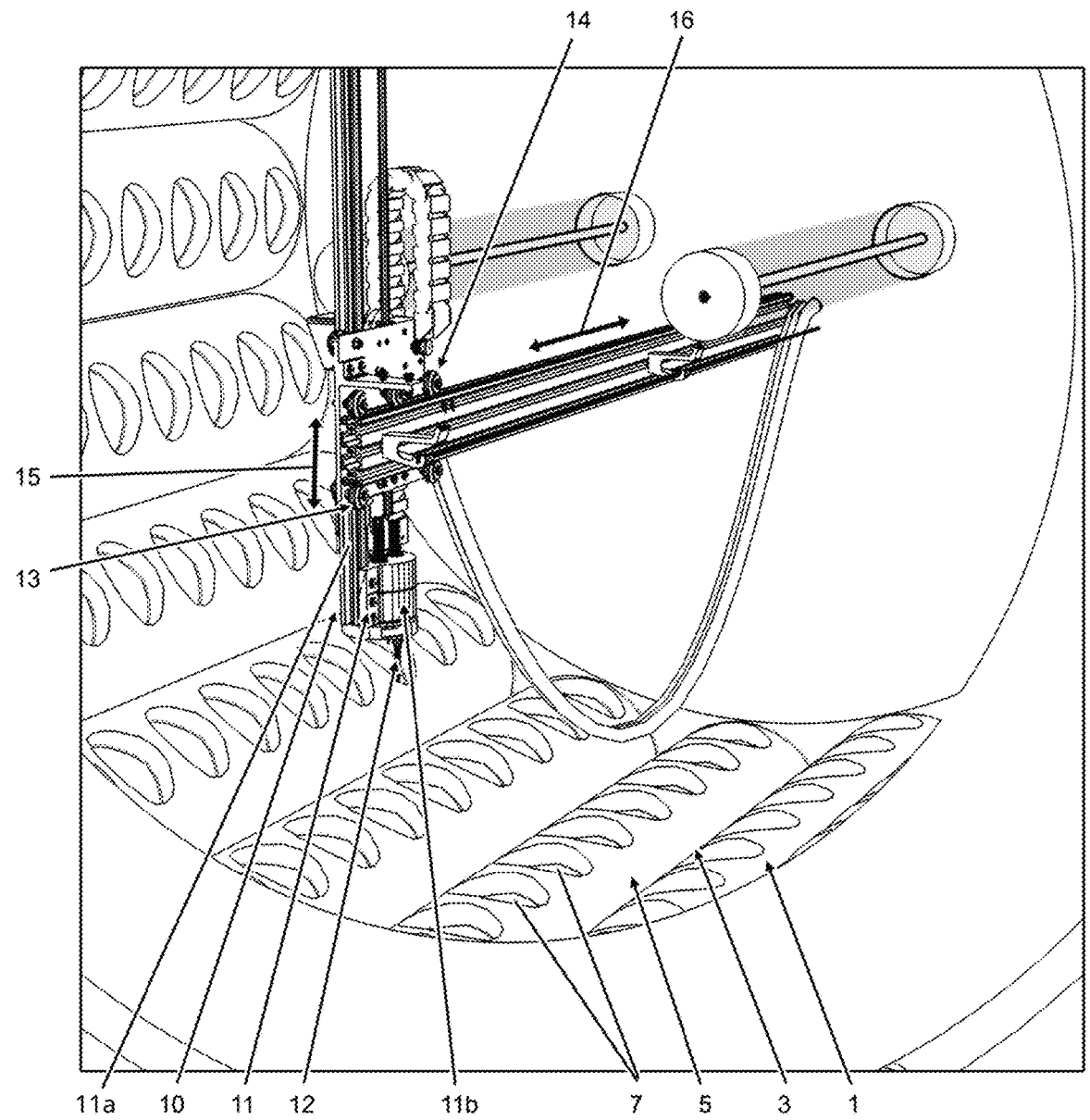
FIG. 6 shows a section of the plant cultivation device according to FIGS. 1 to 5.

Furthermore, the plant cultivation device 1 has a robot device 10 by means of which the supply of the plants 6 can be carried out automatically. The robot device 10 includes, as becomes particularly obvious from FIG. 6, a mounting 11 with a mounting arm 11a and a mounting head 11b arranged at the lower end of the mounting arm 11a. The mounting head 11b is adapted for a releasable mounting of at least one first working head 12. Moreover, the robot device 10 comprises a first linear guide 13 for moving the mounting 11 for the first working head 12 along a first axis (see double arrow 15 in FIG. 6) and a second linear guide 14 for moving the first linear guide 13 together with the mounting 11 for the first working head 12 along a second axis (see double arrow 16 in FIG. 6). In the shown embodiment, the first linear guide 13 and the second linear guide 14 each comprise a guide profile and rollers rolling along said guide profile. In said embodiment, at least individual rollers are driven by means of a drive unit (not shown) in order to effect a movement of the mounting 11 along the first or second axis. In the shown implementation, the first axis of the robot device 10 extends substantially in the vertical direction and the second axis of the robot device 10 extends substantially in the direction of the rotational axis 4 of the receiving drum 3, wherein the second axis of the robot device 10 coincides with the rotational axis 4 of the receiving drum 3. Further translational or rotational degrees of freedom are not provided in the shown implementation variant. In the shown implementation, the second linear guide 14 of the robot device 10 protrudes freely (i.e. without any support from below) forwards from a rear wall 2a of the housing 2 in the direction of the rotational axis 4 of the receiving drum 3.

Figure 7:
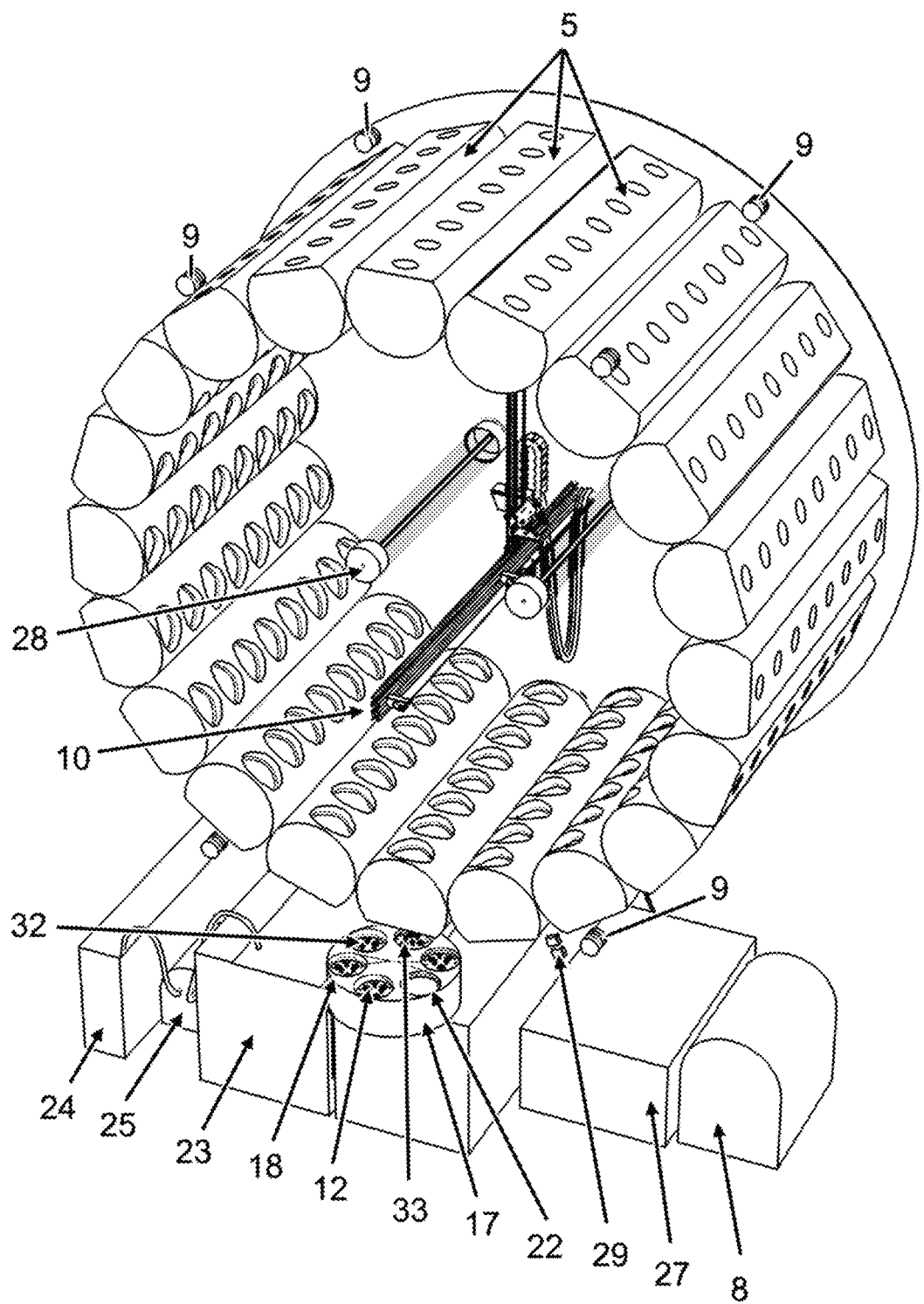
FIG. 7 shows the plant cultivation device according to FIGS. 1 to 6, in which the housing is not represented.

The plant cultivation device 1 further comprises a holder 17 for exchangeable attachments for the exchange of the first working head for a second working head 18, preferably also for the exchange of the first working head 12 for a third working head 32 (see FIG. 7), in particular also for the exchange of the first working head for a fourth working head 33 (see FIG. 7). As a matter of course, also further working heads, for instance a sensor head for measuring the humidity in the plant receiving containers, or a cutting attachment, can be provided. The holder 17 for exchangeable attachments is mounted on the housing 2 such as to be rotatable about a vertical axis 19. In the shown embodiment, the drive 8 is adapted, on the one hand, for rotating the receiving drum 3 and, on the other hand, for rotating the holder 17 for exchangeable attachments about the vertical axis 19. The holder 17 for exchangeable attachments includes at least a first receptacle 20 for the first working head 12 and a second receptacle 21 for the second working head 18. Preferably there are furthermore provided a third receptacle for the third working head and a fourth receptacle for the fourth working head.

In the shown implementation, the first working head 12 is formed as a watering attachment for watering the plants. To this end, the watering attachment comprises a spray head by means of which water can be dispensed onto the plants 6. The second working head 18 is formed as a suction attachment for sucking in seeds from a seed storage compartment 22 and for delivering the sucked-in seeds into one of the plant receiving containers 6. A further receptacle of the holder 17 for exchangeable attachments can be provided as a seed storage compartment 22. The third working head 32 is formed as a sensor attachment for measuring in particular a pH value. The fourth working head 33 is formed as a weed suppression attachment by means of which weed can be removed mechanically.

Substantially one half of the holder 17 for exchangeable attachments protrudes forwards from the housing 2 so that the mounting 11 can be lowered onto the receptacle arranged in the front in order to enable the exchange between the working heads or the reception of seeds.

In the shown implementation (see FIG. 1), the plant cultivation device 1 furthermore comprises a fresh water tank 23 in which fresh water for the supplying of the plants 6 is stored. The fresh water tank 23 is connected to the robot device 10 via a fresh water line. When attaching the watering attachment at the mounting 11, a water-bearing connection from the fresh water tank 9 via the fresh water line to the watering attachment is established so that the water can be dispensed to the plants via the watering attachment. Furthermore, a nutrient container 24 is provided which is connected with the fresh water tank 23 via a pump 25. The process water is accumulated in a process water tank 26 which is arranged at the lowest point of the receiving drum. The control of the electronic components of the plant cultivation device, such as the drive 8 for the receiving drum 3 and for the holder 17 for exchangeable attachments, the pump 25, the drive device for the robot device 10, is performed by means of an electronic control unit (in short control 27).

The plant cultivation device 1 furthermore comprises multiple, in the shown implementation two luminaires 28 which protrude from the rear wall 2a of the housing 2 in the direction of the second linear guide 14 of the robot device 10.

The plant cultivation device 1 further comprises a sensor 29 by means of which the rotational position of the receiving drum 3 is sensed and transmitted to the control 27. Hence, the rotational position of the receiving drum 3 is known when the robot device 10 is moved into the desired working position.

The plant cultivation device 1 further comprises a first blocking device between the receiving drum 3 and the housing 2, wherein by means of said blocking device the rotation of the receiving drum 3 in the one direction 30 of rotation is released, but is blocked constantly in the other direction 31 of rotation. Furthermore, a second blocking device is provided between the receiving drum 3 and the housing 2, wherein said second blocking device is transferable between a release position and a blocking position. In the release position, the rotation of the receiving drum in the first direction 30 of rotation is released and in the blocking position said rotation is blocked. Thereby an undesired slipping of the drum due to an uneven weight distribution because of a varying plant growth is prevented.

What is claimed is:

1. A plant cultivation device (1) comprising:
    a housing (2);
    a receiving drum (3) which is rotatably mounted on the housing (2) and comprises multiple plant receiving containers (5) for plants (6);
    a drive (8) for rotating the receiving drum (3) within the housing (2); and
    a robot device (10) with a mounting (11) for a first working head (12) for supplying the plants (6) in the plant receiving containers (5), comprising a first linear guide (13) for moving the mounting (11) for the first working head (12) along a first axis and comprising a second linear guide (14) for moving the first linear guide (13) together with the mounting (11) for the first working head (12) along a second axis;
    a holder (17) for exchangeable attachments is provided for the exchange of the first working head (12) for a second working head (18), or the first working head (12) for a third working head, or the first working head (12) for a fourth working head; and
    wherein the holder (17) for exchangeable attachments is mounted on the housing (2) pivotally or rotatably about a substantially vertical axis (19), wherein the drive (8) further pivots or rotates the holder (17) for exchangeable attachments.

2. The plant cultivation device (1) according to claim 1, wherein the first axis of the robot device (10) extends substantially in the vertical direction and that the second axis of the robot device (10) extends substantially in the direction of the rotational axis (4) of the receiving drum (3), wherein the second axis of the robot device (10) substantially coincides with the rotational axis (4) of the receiving drum (3).

3. The plant cultivation device (1) according to claim 1, wherein the robot device (10) comprises exactly two translational degrees of freedom, namely along the first axis and the second axis.

4. The plant cultivation device (1) according to claim 1, wherein the drive (8) comprises an electric motor.

5. The plant cultivation device (1) according to claim 1, wherein the holder (17) for exchangeable attachments comprises at least one receptacle (20) for the first working head (12), or a second receptacle (21) for the second working head (21), or a third receptacle for the third working head, or a fourth receptacle for the fourth working head.

6. The plant cultivation device (1) according to claim 1, wherein the first working head (12) is formed as a suction attachment for sucking in seeds, or the second working head (18) is formed as a watering attachment for watering the plants, or the third working head (32) is formed as a sensor attachment for measuring in particular a pH value, or the fourth working head (33) is formed as a weed suppression attachment for suppressing weed.

7. The plant cultivation device (1) according to claim 1, wherein substantially one half of the holder (17) for exchangeable attachments protrudes forwards from the housing (2).

8. The plant cultivation device (1) according to claim 1, wherein the second linear guide (14) of the robot device (10) protrudes forwards in a freely projecting manner from a rear wall (2a) in the direction of the rotational axis (4) of the receiving drum (3).

9. The plant cultivation device (1) according to claim 1, further comprising a fresh water tank (23) connected to the robot device (10) via a fresh water line.

10. The plant cultivation device (1) according to claim 1, wherein the housing (2) is substantially cuboidal.

11. The plant cultivation device (1) according to claim 1, further comprising at least one luminaire (28) at a rear wall (2a) of the housing (2) facing the receiving drum (3) and/or at the second linear guide (14) of the robot device (10).

12. The plant cultivation device (1) according to claim 1, further comprising a sensor (29) for sensing the rotational position of the receiving drum (3) is provided.

13. A plant cultivation device (1) comprising:
a housing (2);
a receiving drum (3) which is rotatably mounted on the housing (2) and comprises multiple plant receiving containers (5) for plants (6);
a drive (8) for rotating the receiving drum (3) within the housing (2); and
a robot device (10) with a mounting (11) for a first working head (12) for supplying the plants (6) in the plant receiving containers (5), comprising a first linear guide (13) for moving the mounting (11) for the first working head (12) along a first axis and comprising a second linear guide (14) for moving the first linear guide (13) together with the mounting (11) for the first working head (12) along a second axis;
a holder (17) for exchangeable attachments is provided for the exchange of the first working head (12) for a second working head (18), or the first working head (12) for a third working head, or the first working head (12) for a fourth working head; and
wherein the first working head (12) is formed as a suction attachment for sucking in seeds, or the second working head (18) is formed as a watering attachment for watering the plants, or the third working head (32) is formed as a sensor attachment for measuring in particular a pH value, or the fourth working head (33) is formed as a weed suppression attachment for suppressing weed.

14. A plant cultivation device (1) comprising:
a housing (2);
a receiving drum (3) which is rotatably mounted on the housing (2) and comprises multiple plant receiving containers (5) for plants (6);
a drive (8) for rotating the receiving drum (3) within the housing (2); and
a robot device (10) with a mounting (11) for a first working head (12) for supplying the plants (6) in the plant receiving containers (5), comprising a first linear guide (13) for moving the mounting (11) for the first working head (12) along a first axis and comprising a second linear guide (14) for moving the first linear guide (13) together with the mounting (11) for the first working head (12) along a second axis;
a holder (17) for exchangeable attachments is provided for the exchange of the first working head (12) for a second working head (18), or the first working head (12) for a third working head, or the first working head (12) for a fourth working head; and
wherein substantially one half of the holder (17) for exchangeable attachments protrudes forwards from the housing (2).

* * * * *